Jan. 16, 1940.  A. H. GENTER  2,187,309
TROLLEY WIRE SUPPORT
Filed July 30, 1938
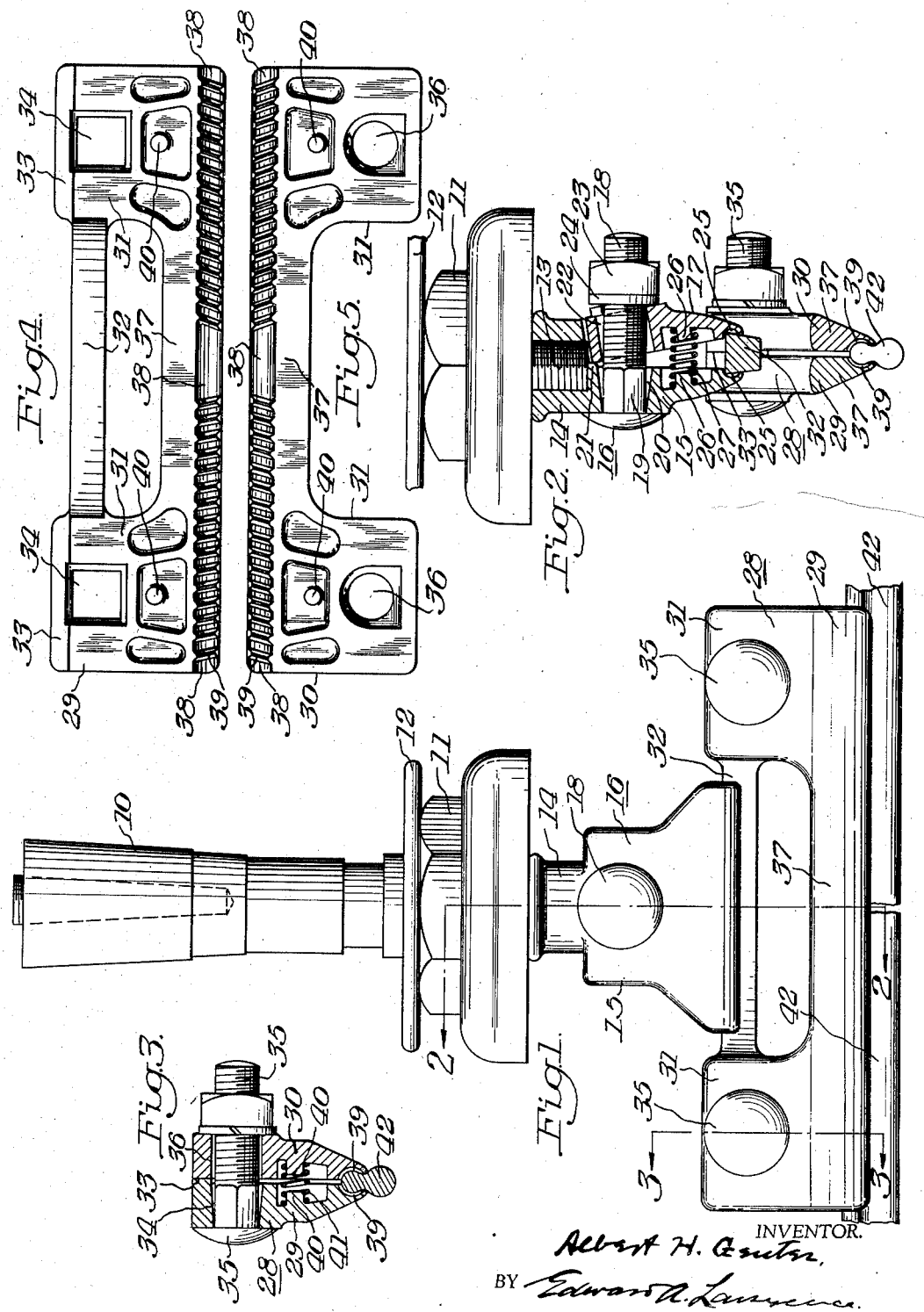
INVENTOR.
Albert H. Genter,
BY Edward A. Lawrence.
his ATTORNEY.

Patented Jan. 16, 1940

2,187,309

UNITED STATES PATENT OFFICE 2,187,309

TROLLEY WIRE SUPPORT

Albert H. Genter, Ross Township, Allegheny County, Pa., assignor to Duquesne Mine Supply Company, Pittsburgh, Pa., a corporation of Pennsylvania Application July 30, 1938, Serial No. 222,248

3 Claims. (Cl. 191—43)

This invention relates generally to trolley wire supports for transmitting electricity and more particularly to trolley wire splicers for supporting adjacent ends of a trolley wire.

The principal object of this invention is the provision of a two-part trolley wire splicer for holding the adjacent ends of a trolley wire in juxtaposition.

Another object is the provision of a two-part trolley wire splicer arranged to grip and retain adjacent ends of a trolley wire and for transmitting an electric current therebetween.

Another object is the provision of a two-part trolley wire splicer arranged to be suspended in an aerial network.

Another object is the provision of a two-part trolley wire clamp for supporting a splicer or trolley wire.

Other objects and advantages will appear hereinafter.

In the accompanying drawing a practical embodiment illustrating the principles of this invention is shown wherein, Fig. 1 is a side elevation showing an expansion bolt, an insulating hanger, a clamp and a splicer in assembled relation illustrating this invention.

Fig. 2 is a sectional view taken along the line 2—2 of Fig. 1.

Fig. 3 is a sectional view taken on the line 3—3 of Fig. 1.

Figs. 4 and 5 are side elevations showing the inner faces of the splicer parts.

Referring to the drawing, 10 represents an expansion bolt arranged to be secured to any suitable aerial superstructure, guard-board or into the ceiling of a mine. The lower end of this expansion bolt is preferably threadably engaged with the upper end of the insulating hanger 11 which is provided with the disk 12 arranged to engage the under surface in which the expansion bolt is secured.

The hanger is provided with a depending stud 13 arranged to threadably telescope within the bore of the cylindrical lug 14 formed integral with the stationary jaw member 15 of the expansion clamp 16. The movable jaw member 17 is complementary to the stationary section 15 and is secured thereby by means of the transversely disposed bolt 18. The bolt 18 is provided with a squared shank 19 adjacent the head thereof which fits in the square hole 20 of the jaw member 15 to prevent the bolt from turning therein.

Immediately above the hole 20 the jaw member 15 is provided with the shoulder 21 forming a fulcrum for the upper end of the movable jaw member 17. The hole 22 in the jaw member 17 is round and is provided with sufficient clearance to allow movement of the bolt 18 therein. The jaw members are held in clamping relation by means of the nut 23 which is threadably secured to the bolt 18 and locked in place by the split lock washer 24.

The inner surface of the lower edges of the jaw members are provided with the oppositely disposed complementary grooves 25 arranged to grip a trolley wire or supporting rod of a splicer. These grooves may be provided with teeth for biting into the wire to prevent the same from moving therethrough. An oppositely disposed inwardly extending lug 26 is provided on each jaw member between the bolt holes and the wire clamping grooves for receiving the helical spring 27 which acts to expand the jaw members when the bolt is loosened.

The splicer 28 is made up of two clamping jaw members 29 and 30, the ends 31 of which are similar to that of the clamp 16. The spaced ends 31 of the jaw member 29 are connected by the splicer supporting rod 32 which is formed integral therewith and is preferably of inverted frusto conical cross section as shown in Fig. 2. The axial center of the supporting rod is substantially coincident with the plane of the splicer clamp to maintain vertical alignment of the trolley wire with the supporting structure. A portion of the rod 32 extends over the inner faces of the end sections 31 to provide the shoulders 33 forming a fulcrum for each clamping section. Each end section 31 of the jaw member 29 is provided with square holes 34 for receiving the squared shanks of the clamping bolts 35. The end sections 31 of the jaw member 30 on the other hand are provided with round holes as indicated at 36.

The end sections 31 of the jaw members are connected at their lower ends by the intermediate clamping portions 37 formed integral therewith and having oppositely disposed complementary grooves 38 each of which is provided with a series of arcuate teeth 39 for gripping the trolley wire. As shown in Figs. 4 and 5 it is preferable to slant the teeth 39 in opposite directions on each end of the jaw member so that the ends of the trolley wire gripped produce a wedging action when subjected to a force tending to withdraw them from the splicer. The teeth 39 are also preferably constructed so that they will bite into the trolley wire a sufficient depth to produce a grip substantially equivalent to the tensile strength of the wire being supported. This character of grip with a comparatively few number of teeth has been found to produce an electrical contact between the clamping jaws and the trolley wire ends far superior to any other splicer known. However the number of equivalent circular mills of the teeth are preferably greater than the circular mills of the trolley wire being carried to insure proper electrical contact under all conditions.

Each end section 31 of the clamping jaws is provided with oppositely disposed lugs 40 for receiving the helical springs 41 which expand the jaw members when the bolts 35 are loosened.

The cross section of the trolley wire 42 shown in Figs. 1, 2 and 3 is that of a figure eight which is popular in wire for heavy railway construction and readily adapts itself for this type of equipment. However ordinary trolley wire having oval or circular cross section is equally adaptable for use with this splicer.

Another advantage attainable with this improved splicer is the fact that one section thereof may be mounted before the wire is stretched and placed in the clamping grooves.

Although the provision of the expansion springs 41 is highly advantageous, said springs may be omitted without departing from the principles and scope of my invention.

I claim:

1. A wire splicing clamp comprising a pair of complementary elongated jaw members, means defining a longitudinal groove extending the full length on the inner face of each jaw member adjacent one edge thereof for receiving the abutting ends of the wire to be spliced when said jaw members are held in assembled relation, a set of thread-like teeth in each groove adjacent each end thereof for gripping the wire ends, the sets of teeth in each groove being upwardly inclined in opposite directions toward their respective groove ends, and means for drawing said jaw members together to clamp the wire ends within said grooves.

2. A wire splice clamp comprising complementary jaw members each provided with a longitudinally extending groove adjacent its lower edge, said grooves coacting to clasp the wires when the members are assembled, upwardly extending ears adjacent the ends of the jaw members, the opposed ears of the jaw members contacting at their upper ends to provide a fulcrum and said ears being provided below the fulcrum with registering holes to receive clamping bolts, and the ears of one jaw member being provided with an integral connecting hanger bar spaced upwardly from the intermediate portion of the jaw member, the axial center of said bar being disposed in the plane of the parting of the coacting grooves.

3. A wire splicer comprising a pair of complementary jaw members, each jaw member having two clamping portions connected at their lower ends by an integral intermediate portion, means defining a longitudinal groove extending through the intermediate and clamping portions on the inner face of each jaw member adjacent the lower edge thereof for receiving the abutting ends of the wire to be spliced when the jaw members are assembled, a fulcrum adjacent the upper edge of the clamping portions, means defining aligned holes through the mating clamping portions intermediate the fulcrum and the groove, clamping bolts passing through said holes for holding the wire ends in said grooves, resilient means between the mating clamping portions for separating the jaw members when the clamping bolts are loosened, and a hanger bar integrally connecting the upper ends of the clamping portions of one jaw member and spaced from said intermediate portion, the axial center of said bar being disposed in the plane dividing the jaw members.

ALBERT H. GENTER.